US012210570B2

(12) United States Patent
Pidduck

(10) Patent No.: US 12,210,570 B2
(45) Date of Patent: Jan. 28, 2025

(54) SYSTEM AND METHOD OF MANAGING INDEXING FOR SEARCH INDEX PARTITIONS

(71) Applicant: OPEN TEXT SA ULC, Halifax (CA)

(72) Inventor: Patrick Thomas Sidney Pidduck, Waterloo (CA)

(73) Assignee: OPEN TEXT SA ULC, Halifax (CA)

( * ) Notice: Subject to any disclaimer, the term of this patent is extended or adjusted under 35 U.S.C. 154(b) by 801 days.

(21) Appl. No.: 16/628,940

(22) PCT Filed: Jul. 5, 2018

(86) PCT No.: PCT/CA2018/050819
§ 371 (c)(1),
(2) Date: Jan. 6, 2020

(87) PCT Pub. No.: WO2019/006551
PCT Pub. Date: Jan. 10, 2019

(65) Prior Publication Data
US 2020/0218705 A1 Jul. 9, 2020

Related U.S. Application Data

(60) Provisional application No. 62/529,287, filed on Jul. 6, 2017.

(51) Int. Cl.
*G06F 16/901* (2019.01)
*G06F 11/30* (2006.01)

(52) U.S. Cl.
CPC .......... *G06F 16/901* (2019.01); *G06F 11/302* (2013.01)

(58) Field of Classification Search
CPC ....... G06F 16/901–9027; G06F 11/302; G06F 16/951; G06F 16/2219; G06F 16/2228; G06F 16/24573; G06F 16/953
See application file for complete search history.

(56) References Cited

U.S. PATENT DOCUMENTS

| 6,125,370 A | 9/2000 | Courter |
|---|---|---|
| 6,269,373 B1 | 7/2001 | Apte |

(Continued)

FOREIGN PATENT DOCUMENTS

EP 0683452 A1 11/1995

OTHER PUBLICATIONS

European Search Report issued for European Patent Application No. 18827726.3, mailed Nov. 18, 2020, 7 pages.

(Continued)

*Primary Examiner* — Taelor Kim
(74) *Attorney, Agent, or Firm* — Sprinkle IP Law Group

(57) ABSTRACT

Embodiments as disclosed herein provide for a system and method that can manage indexing for search index partitions in a computerized search system in an automated, efficient, and intelligent manner. In particular, a search index may be partitioned. One or more index partitions may be specifically indicated as one or more reserved partitions configured to handle indexing requests associated with processing a very large amount of information. When an indexing request is received that requests indexing of a very large amount of information, the indexing request may be processed for a reserved index partition that is reserved for indexing objects associated with a very large amount of information; otherwise, the request may be processed for another index partition.

18 Claims, 5 Drawing Sheets

(56) References Cited

U.S. PATENT DOCUMENTS

| | | | |
|---|---|---|---|
| 7,136,883 | B2 | 11/2006 | Flamma |
| 7,146,389 | B2 | 12/2006 | Ebata |
| 7,174,346 | B1 | 2/2007 | Gharachorloo et al. |
| 7,293,016 | B1 | 11/2007 | Shakib et al. |
| 7,809,762 | B1 | 10/2010 | Parker |
| 8,364,677 | B2 | 1/2013 | Brodfuehrer |
| 8,533,181 | B2 | 9/2013 | Hu |
| 8,732,139 | B2 | 5/2014 | Schreter |
| 8,868,526 | B2 | 10/2014 | Blakrishnan |
| 8,898,204 | B1 | 11/2014 | Sathe |
| 8,909,615 | B2 | 12/2014 | Pidduck et al. |
| 9,836,541 | B2 | 12/2017 | Pidduck et al. |
| 9,900,397 | B1* | 2/2018 | Cope ............... H04L 63/08 |
| 10,642,808 | B1* | 5/2020 | Kejser ............ G06F 16/215 |
| 2004/0044698 | A1 | 3/2004 | Ebata |
| 2005/0165750 | A1 | 7/2005 | Shakib et al. |
| 2006/0190243 | A1 | 8/2006 | Barkai |
| 2007/0061441 | A1* | 3/2007 | Landis ........... G06F 9/45558 709/224 |
| 2007/0067366 | A1* | 3/2007 | Landis ............ G06F 12/109 |
| 2009/0157666 | A1 | 6/2009 | Gehrke et al. |
| 2010/0306238 | A1 | 12/2010 | Balakrishnan et al. |
| 2010/0306268 | A1 | 12/2010 | Bhatti |
| 2011/0225165 | A1 | 9/2011 | Burstein |
| 2012/0143873 | A1 | 6/2012 | Saadat |
| 2013/0290263 | A1* | 10/2013 | Beaverson ........ G06F 16/13 707/649 |
| 2014/0181071 | A1* | 6/2014 | Pidduck .......... G06F 16/23 707/711 |
| 2014/0181122 | A1* | 6/2014 | Jain ............... G06F 16/328 707/748 |
| 2015/0075080 | A1 | 3/2015 | Pidduck et al. |
| 2016/0063021 | A1 | 3/2016 | Morgan et al. |
| 2017/0091308 | A1 | 3/2017 | Tan et al. |
| 2020/0218705 | A1 | 7/2020 | Pidduck et al. |
| 2020/0250163 | A1* | 8/2020 | Kuimelis ......... G06F 16/2255 |

OTHER PUBLICATIONS

Kane et al., "Distribution by Document Size," University of Waterloo, Canada, School of Computer Science, 2014, 6 pages.

European Examination Report issued for European Patent Application No. 18827726.3, mailed Dec. 13, 2021, 6 pages.

International Preliminary Report on Patentability (IPRP) issued for International Application No. PCT/CA2018/050819, mailed Jan. 16, 2020, 7 pages.

International Search Report and Written Report issued for International Patent Application No. PCT/CA2018/050819, mailed Oct. 10, 2018, 9 pages.

Notice of Allowance issued for U.S. Appl. No. 13/595,031, mailed Jul. 30, 2014, 12 pages.

Office Action issued for U.S. Appl. No. 14/539,542, mailed Oct. 21, 2015, 19 pgs.

Office Action issued for U.S. Appl. No. 14/539,542, mailed Jun. 8, 2016, 15 pgs.

Office Action for U.S. Appl. No. 14/539,542, mailed Dec. 13, 2016, 17 pgs.

Notice of Allowance issued for U.S. Appl. No. 14/539,542, mailed Jul. 28, 2017, 3 pgs.

* cited by examiner

| OBJECT ID | AUTHOR ID | OWNER ID | EDITOR ID | AUTHOR NAME | OWNER NAME | CREATOR NAME | EDITOR NAME | TEXT |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |

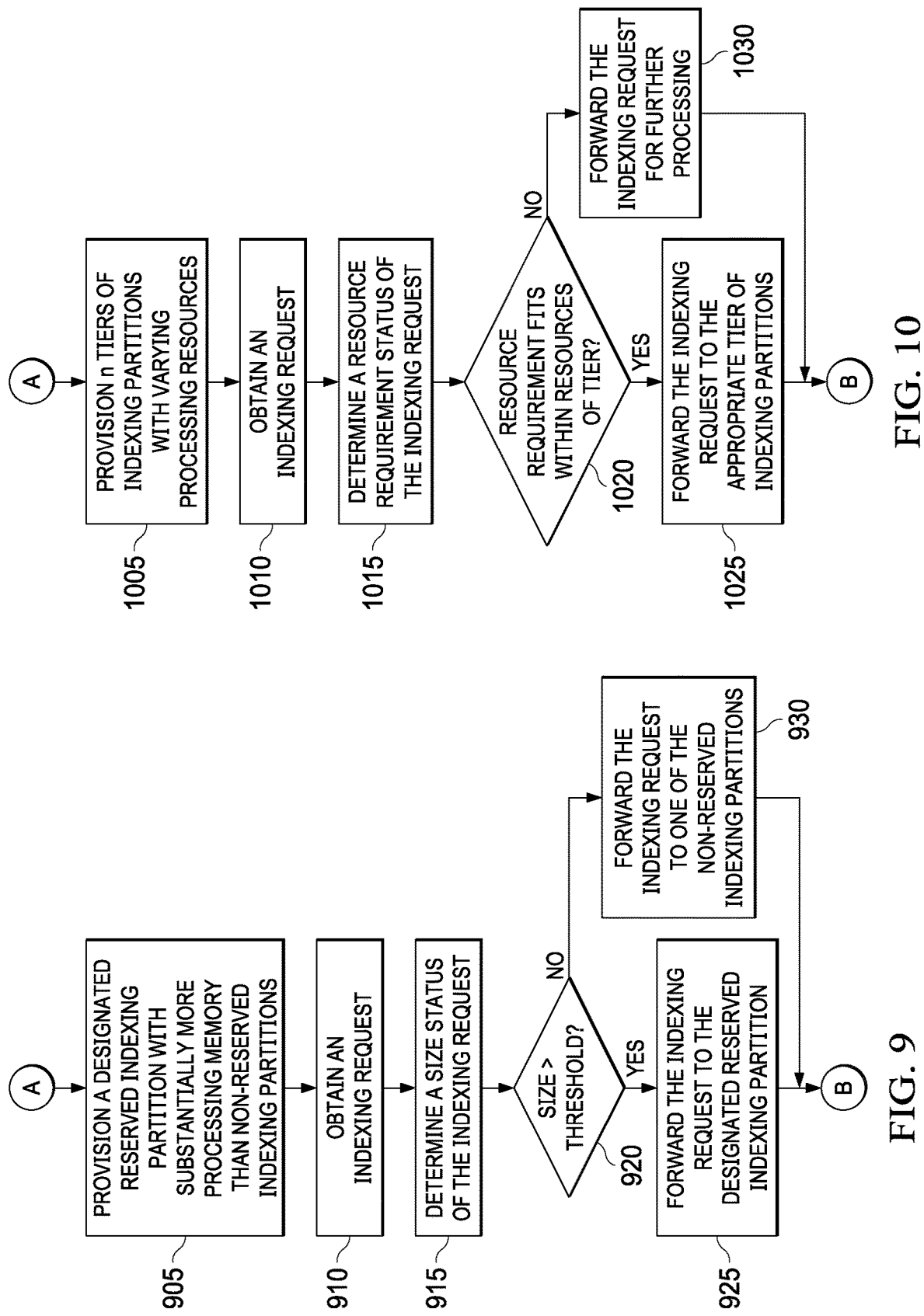

SYSTEM AND METHOD OF MANAGING INDEXING FOR SEARCH INDEX PARTITIONS

CROSS-REFERENCE TO RELATED APPLICATION(S)

This is a national stage application of and claims the benefit of priority to International Application No. PCT/CA2018/050819, filed Jul. 5, 2018, entitled "SYSTEM AND METHOD OF MANAGING INDEXING FOR SEARCH INDEX PARTITIONS," this application claims a benefit of priority under 35 U.S.C. § 119 to U.S. Provisional Application No. 62/529,287, filed Jul. 6, 2017, entitled "SYSTEM AND METHOD OF MANAGING INDEXING FOR SEARCH INDEX PARTITIONS," by inventor Pidduck, the entire contents of which are hereby expressly incorporated herein by reference for all purposes.

TECHNICAL FIELD

This disclosure relates generally to computerized search systems. In particular, this disclosure relates to indexing objects for computerized search systems in a content management environment. Specifically, this disclosure relates to managing indexing for search index partitions. Even more specifically, this disclosure relates to managing indexing of very large objects and smaller objects in the context of searching of content in a content management environment.

BACKGROUND

Document management systems often employ a search engine to provide fast retrieval of information. A search engine can search the metadata and text of documents in a search index to determine which documents match search criteria without having to parse the document itself.

As the volume of information committed to a search system increases, multiple search systems may be employed to share responsibility for managing the search index. For example, the index may be split into smaller components, referred to herein as partitions. Each partition may have a capacity limit, as well as a processing resources limit, based on resources such as available memory, disk space, or other resource constraints. For example, each partition may have a memory limit for processing information for indexing in the partition.

Further, in computerized search systems, when objects are provided to a search engine for indexing, they may need to be converted, analyzed and transformed as part of the indexing process. There may be many different tasks that need to be performed in order to prepare the objects to be indexed. For instance: files within an archive (such as a "ZIP" file) may need to be extracted and decompressed; document files may need to be filtered to extract their full text content; encrypted information may require decryption; encoded data may need to be converted to another encoding format; image files may need to have OCR (Optical Character Recognition) applied to convert the image into text; text strings may need to be broken into words (or tokens); audio files may need to have voice identification tags added; and so forth. There may be a large number of these steps, depending on the type of object that is being presented for indexing. Such processing may be resource-intensive (e.g., time-consuming, processor-intensive, memory-intensive, etc.), particularly for very large objects (e.g., documents, files, etc.).

As partitions are filled with new data from indexing operations, they approach a point at which they are eventually deemed to be full. Further, processing very large objects for indexing in the partitions may be burdensome on processors, both in the amount of processing time and memory (e.g., random access memory (RAM)) required to process the very large objects.

In a conventional system, there may be predetermined threshold values (e.g., cutoffs) which determine the amount of information that will be processed per indexing request, with the object information (e.g., text, metadata) being truncated for those indexing requests for which a threshold is surpassed. For such objects, the truncated portions not processed may simply be not indexed (i.e., only the portion not truncated out, may be indexed). Further, there may be other techniques used for reacting to very large objects, including discarding all of the text of the object, or even discarding or ignoring the entire object as "not indexable." While it may, in some cases, be desirable to be able to perform searches based on this incomplete information, this may not always be true. For example, in a litigation discovery process, a user may employ a search system to find all objects which are related to a specific patent application. If the objects were not perfectly indexed, the user may not know that the search results contain errors or are incomplete. As a result, the user may miss important documents.

Further, processing of very large objects may create a system management burden, and may result in a significant indexing delay if several partitions are processing very large objects simultaneously. For example, smaller objects (which may each be processed more quickly than the larger objects) may be forced to wait for indexing while the larger objects are tying up processing resources for indexing processing.

What is needed then, are improved systems and methods for the indexing of large objects in a search system.

SUMMARY

To those ends, among others, embodiments as disclosed herein provide for a system and method that can manage indexing for search index partitions in a computerized search system in an automated, efficient, and intelligent manner. In particular, a computerized search system may comprise a search engine. This search engine may maintain a search index for objects (e.g., documents or other objects in a repository). This search index may be partitioned, each partition having a predetermined memory capacity for processing objects for indexing.

In one embodiment, one or more index partitions may be specifically indicated as one or more reserved partitions configured to handle indexing requests associated with processing a very large amount of information (e.g., for a very large object, a very large document, a complex object, etc.). When an indexing request is received that requests indexing of a very large amount of information (e.g., a very large amount of text, a very large amount of metadata, etc.), the indexing request may be processed for a reserved index partition that is reserved for indexing objects associated with a very large amount of information; otherwise, the request may be processed for another (non-reserved) index partition.

In some embodiments, a plurality of tiers of index partitions may each be designated as being capable of handling a particular range of required computing resources for handling indexing requests associated with objects having varying attributes. When an indexing request is received for an object, an amount of required computing resources for indexing the object may be determined, and the indexing request may be processed for a partition included in a tier associated with a range of computing resources that matches the determined amount.

One embodiment provides a computer program product that comprises a non-transitory computer readable medium having a set of computer instructions stored on it. The instructions are executable by a computer processor to perform operations as described above.

Another embodiment provides a computerized search system comprising at least one non-transitory computer readable medium storing instructions translatable by at least one processor to perform operations as described above.

Embodiments disclosed herein can provide many advantages. For example, by having one or more index partitions reserved (i.e., designated) for indexing requests associated with processing a very large amount of information, more expensive, greater capacity computing resources (e.g., memory, faster processor, etc.) may be provided for the reserved index partitions, while lesser capacity, less expensive computing resources may be utilized for the other index partitions. Further, by processing more burdensome indexing requests at the reserved one or more partitions, the other partitions may process less burdensome indexing requests significantly faster and more efficiently.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 9 depicts a flow diagram illustrating one embodiment of a method for managing an index partition.

FIG. 10 depicts a flow diagram illustrating one embodiment of a method for managing an index partition.

DETAILED DESCRIPTION

Figure 1:
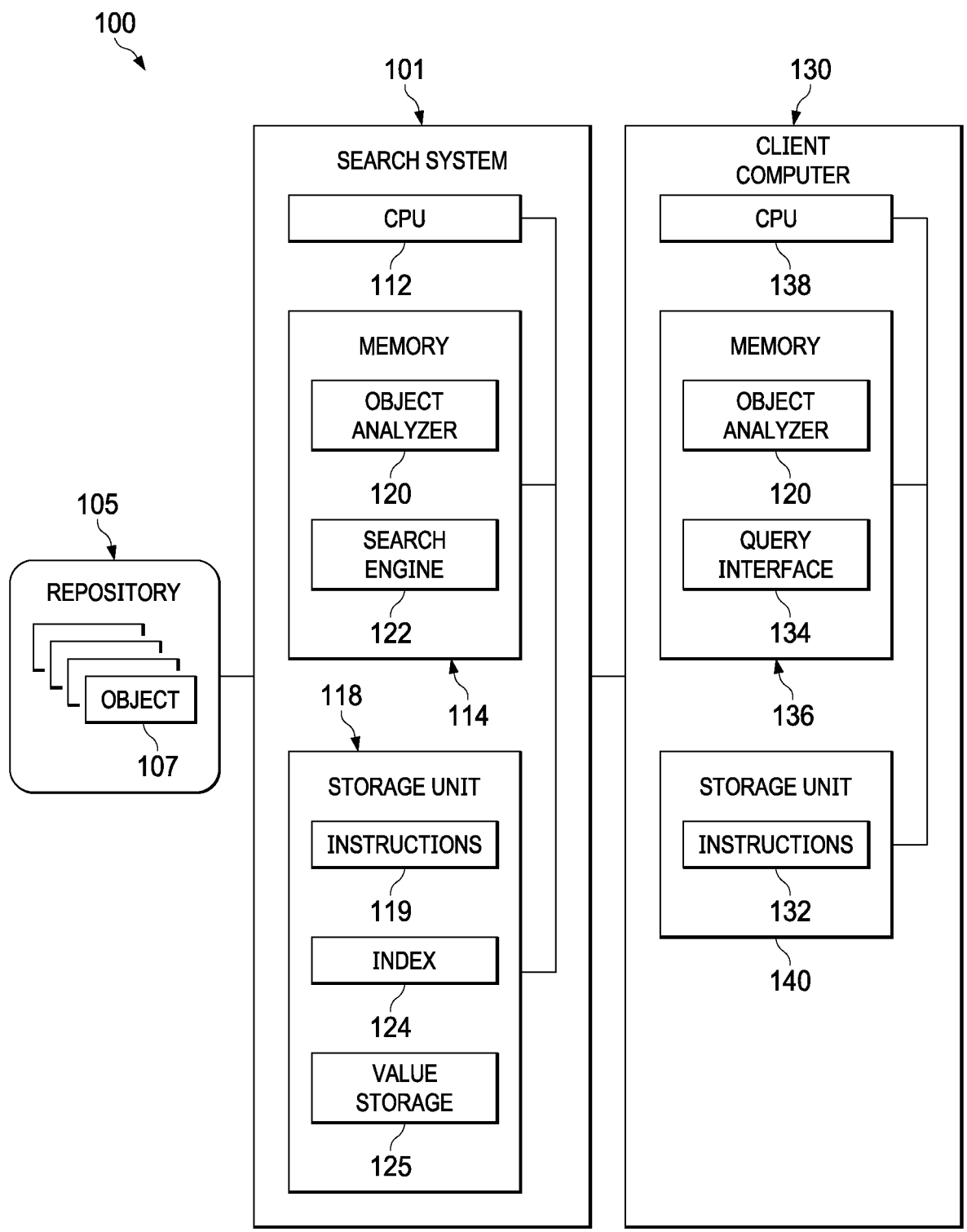
FIG. 1 depicts one embodiment of a computing environment in which one embodiment of a search system can be implemented.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before delving into embodiments in more detail, some brief context may be useful. In a content system (e.g., a content management system or collaborative content sharing system) that manages or stores content (e.g., electronic documents) there is often a need to implement search capabilities.

Document management systems often employ a search engine to allow for fast retrieval of information. A search engine can search information such as the metadata and text of documents in a search index to determine which documents match search criteria without having to parse the document itself.

Users of a system may typically have only a small percentage of documents that contain very large amounts of information. For example, currently a user may consider a "very large" amount of information to be tens of megabytes (MB) to hundreds of MB (or more) of text and/or metadata. For example, log files, or print/pdf files that include tens of thousands of pages of invoices or statements may be determined as containing (or being associated with) very large amounts of information (e.g., text and/or metadata).

One skilled in the art of computing will understand that the size (or other measure) defining a "very large" amount may vary over time, and thus may be configurable as needed (e.g., via a threshold value in a configuration file).

For example, in a current example processing environment, a "typical" document may, after pre-processing, contain 100 kilobytes (KB), or less, of text and/or metadata. As discussed above, one conventional approach to handling very large documents utilizes truncation. For example, an arbitrary size (e.g., 10 MB) may be chosen, and the first 10 MB of data may be indexed, while the rest may be discarded. Such a conventional truncating approach may be used since processing very large files for indexing and search may have much larger processing resource (e.g., memory) requirements.

It may also be possible to adjust configuration settings for a search engine to support processing of very large documents. However, this may entail adding additional memory (e.g., 4 GB of memory) to each partition to be able handle the very large documents. This additional memory (for each partition) may be very expensive for a user, and may be required whether very large files are processed or not.

In a current example processing environment, a partition may be nominally optimal for up to approximately 10 million items. Thus, for example, if a user has 500 million documents, the user may require approximately 50 partitions. As another example, there may be customers using 200 partitions, or more.

In such a current example processing environment (e.g., with 50 partitions), if the user needs to be able to index and search the entire contents of very large documents, the user may need to add 4 GB of extra memory (e.g., RAM) for each of the partitions (e.g., an additional 200 GB of memory, for 50 total partitions). As an example, this may double the overall memory requirements compared to a search index that does not handle very large files. Currently, 200 GB of RAM may be very expensive, and may exceed the capacity of existing computers serving the user, triggering a need for more computers.

In accordance with example techniques discussed herein, specializations may be created in a system for different types of search partitions. For example, 2 of the 50 partitions discussed above may be targeted, and may be designated as reserved partitions for very large objects (e.g., documents). For this example, the memory penalty for handling very large objects is only incurred for 2 partitions—i.e., 8 GB total of additional memory instead of 200 GB (e.g., for adding 4 GB memory for each of the 50 partitions). For example, the lower memory budget (e.g., 8 GB vs 200 GB) may thus more easily be absorbed economically and within existing computers serving the user.

As discussed further below, the indexing process may be adjusted to direct new indexing requests to a particular partition based on size of the object to be indexed (e.g., text, metadata, etc. included in the new indexing requests). For example, if the size associated with the object to be indexed exceeds a predetermined threshold value (e.g., 5 MB of text and/or metadata), then the indexing request may be directed to a very large document partition (e.g., a reserved partition that is reserved for indexing very large documents). Otherwise, the new indexing request may be sent to another partition for indexing (e.g., a non-reserved partition, that is not reserved for indexing very large documents).

It should also be noted here, that while certain embodiments may focus on differentiating partitions based on the size of an object, other criteria or variables may be used to differentiate or separate partitions for indexing. Such other criteria may include, for example, speed of disk I/O, amount of disk space, number or speed of CPUs, presence of co-processors, or other criteria. Likewise, in certain embodiments there may be other decision parameters for determining whether different partitions are needed or desired, such as complexity measurements, type of data (e.g. video), or other parameters.

Embodiments of a search engine described herein provide systems and methods for managing index partitions to enable indexing of full content of very large (or other types of) objects. It may be helpful to first discuss an example search system.

FIG. 1 depicts a block diagram illustrating one embodiment of a computing environment 100 with object search system 101. Computing environment 100 includes an object repository 105 storing objects 107 of interest (documents, images, emails or other objects that may be searched). Object repository 105 may comprise a file server or database system or other storage mechanism remotely or locally accessible by search system 101.

In the embodiment of FIG. 1, search system 101 comprises a server having a central processing unit 112 connected to a memory 114 and storage unit 118 via a bus. Central processing unit 112 may represent a single processor, multiple processors, a processor(s) with multiple processing cores and the like. Storage unit 118 may include a non-transitory storage medium such as hard-disk drives, flash memory devices, optical media and the like. Search system 101 may be connected to a data communications network (not shown).

Storage unit 118 stores computer executable instructions 119, index 124, and value storage 125. Computer executable instructions 119 can represent multiple programs and operating system code. In one embodiment, instructions 119 are executable to provide an object analyzer 120 and search engine 122. Object analyzer 120 and search engine 122 may be portions of the same program or may be separate programs. According to one embodiment, for example, object analyzer 120 is a component of a document management system while search engine 122 is a separate program that interfaces with the document management system. Furthermore, object analyzer 120 and search engine 122 can be implemented on different computing systems and can, themselves, be distributed.

Index 124 includes metadata used to identify objects in response to a search query and may also include text used to identify objects. Index 124 can include a single index containing metadata and text, separate metadata and text indices or other arrangements of information. While shown as a single index, index 124 may include multiple indices. Further, as will be described further below, index 124 may be partitioned, with different objects being represented in each partition.

Client computer system 130 may include components similar to those of the server of search system 101, such as CPU 138, memory 136, and storage 140. Additionally, client computer system 130 may include executable instructions 132 to provide a user interface 134 that allows a user to enter a search query. The user interface may be provided through a web browser, file system interface or other program.

The search system 101 of FIG. 1 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 130 may include any suitable desktop computer, laptop, mobile device, server or other computing system.

In operation, object analyzer 120 analyzes objects in object repository 105 to determine information to be indexed in index 124. Object analyzer 120 can send indexing instructions to search engine 122 to direct search engine 122 to add/modify/or delete metadata or text in index 124, as discussed below. When a search query is received, search engine 122 can search the information in index 124 to identify objects responsive to the search query and return a list or other representation of those objects to client computer 130.

Figure 2:
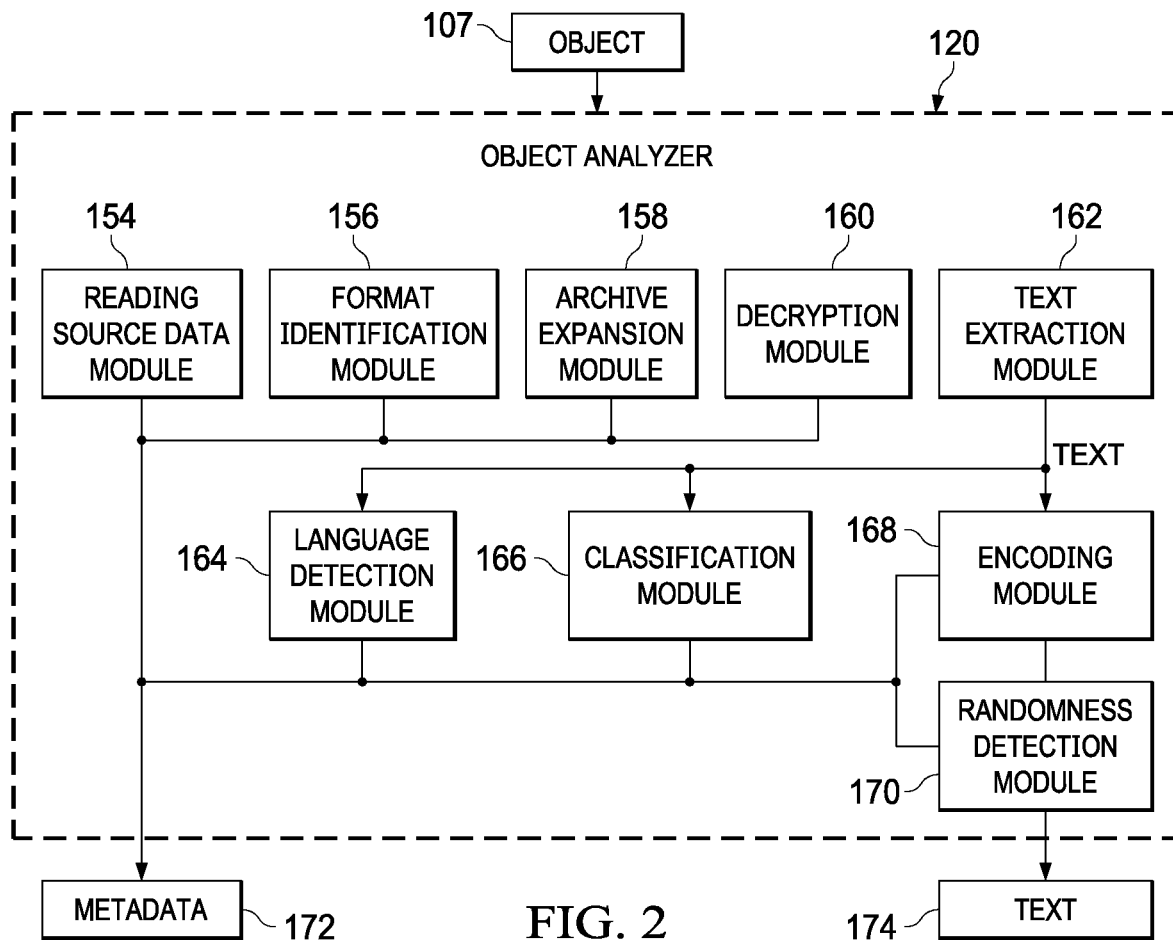
FIG. 2 depicts a functional block diagram illustrating one embodiment of an object analyzer.

FIG. 2 depicts a diagrammatic representation of one embodiment of an object analyzer 120 for analyzing an object 107. Object analyzer 120 can comprise various modules to process an object 107. Reading source data module 154 can open the object 107. Format identification module 156 examines the object to determine what type of file or data the object 107 comprises. Archive expansion module 158 unzips files or otherwise decompresses files if the object 107 is a compressed file. Decryption module 160 decrypts all or part of the data in the object 107. Text extraction module 162 applies rules to text in the object 107 to extract text for index 124. Language detection module 164 examines the text to determine the language in which the text is written. Classification module 166 applies rules based upon text and metadata to classify content. Encoding module 168 can convert text to a supported encoding. Randomness detection module 170 can analyze data to be indexed to reject random information.

Object analyzer 120 may include modules that can derive metadata for object 107. For example, a document management system may provide a limited amount of metadata with the object 107. Object analyzer 120 can derive other metadata from the metadata provided, text or other properties of the object 107. As a specific example, a filter or piece of code that extracts the text from a PowerPoint presentation might also create metadata about the presentation. In this example, the metadata which is not provided by the document management system and which is derived by object analyzer 120 may include the number of slides in the presentation, the title of the file, the name of the presentation author, or the size of paper the presentation was designed to print on. More complex examples of derived metadata might include statistical analysis to generate a list of keyword or key concepts in the document; determining the subject person or company of the text; sentiment analysis—is the tone of the text positive or negative; or language identification—in what language is the text written. Further examples of metadata that may either be provided by the document management system (or other application) or derived by the analyzer may be the date the object was created, the size of the object in bytes, the name of the object, a description of the object or the like.

The embodiment of FIG. 2 is provided by way of example. Object analyzer 120 may include any number of other modules to analyze an object and extract text 174 and metadata 172 to be indexed. Object analyzer 120 may be a portion of a larger program, such as a document management program, may be a separate program or may be implemented according to any suitable programming architecture. In one embodiment, the process of determining metadata 172 and text 174 to be indexed may be carried out by any number of different programs on a computer system or distributed across computer systems.

Metadata 172 and text 174 thus processed by object analyzer 120 may be provided to a search engine. An example search engine will now be described with reference to FIG. 3.

Figure 3:
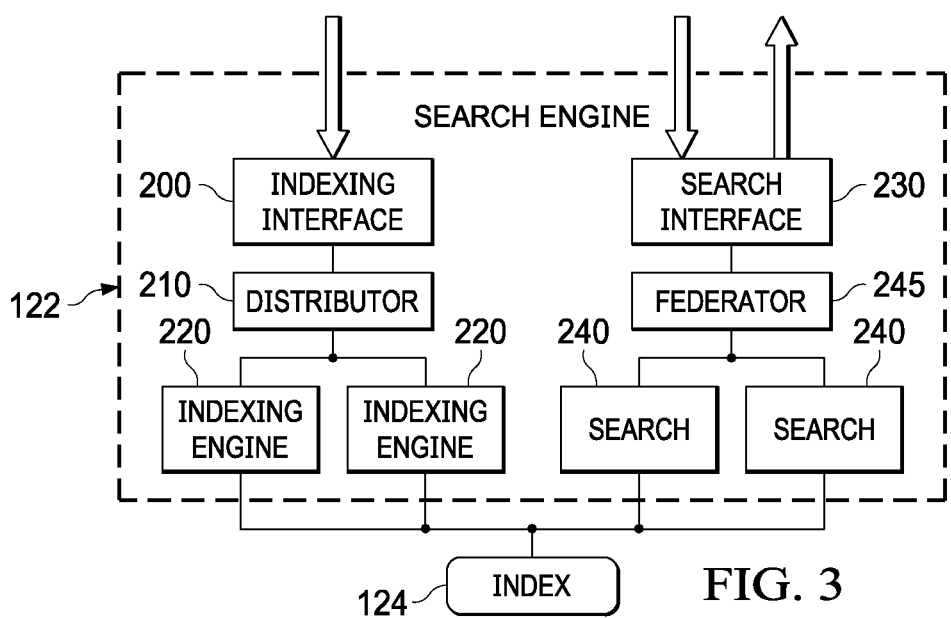
FIG. 3 depicts a functional block diagram illustrating one embodiment of a search engine.

FIG. 3 depicts a diagrammatic representation of logical blocks for one embodiment of a search engine 122. Search engine 122 may provide an indexing interface 200 that receives indexing requests (e.g., from object analyzer 120) or other source. A distributor module 210 may distribute the indexing requests to indexing engine 220 that act on an indexing request to update index 124. Search engine 122 may also include a search interface 230 to receive queries (e.g., from a document management system or other source). Search interface 230 may send queries to search modules 240. Federator 245 gathers the results from all search modules together, and generates a response to the query received through search interface 230. Search modules 240 are responsible for performing searches on an index partition, and performing tasks such as computing relevance score, sorting results, and retrieving metadata regions to return in a query.

Search interface 230 may be configured to receive a search query from a user, and search index 124 for objects that meet the criteria set forth in the search query. Query language may also be configured to permit sorting results of a search. Various rules may be used to determine the sort order. In this example, a user constructed the search query. It should be noted, however, that the user could be any system that issues queries to the search system, and may include other computer programs searching on behalf of other users, creating reports or running automatic processes. Additionally, as described above, there can be many different types of metadata in the search index. Thus, the search queries are not restricted to "text" based search terms.

In the context of this disclosure, the phrase "search term" represents a technical concept or interpretation. For example, a search term in the context of this disclosure can be a word, a string, or any combination of the following:
phrases
numbers
strings
logical operations (e.g., AND, OR, NOT, etc.)
ordering or operations (e.g., using parenthesis)
relationships (e.g., greater than, less than, not equal to, etc.)
similarities based on thesaurus, stemming, sounds-like, etc.
wildcards and pattern matching To this end, a search term can also refer to any term that is used in a query and that has been modified or generated by any commonly used techniques.

For context, a search term could be a word "john" or a more complex expression like:
(>"bob" or !=("123" or a*)) and (sounds-like "smith" or thesaurus "doctor" or "medical doctor" or stem "medical").

The embodiment of FIG. 3 is provided by way of example. Search engine 122 may include any number of other modules or configurations to update and search an index. For example, search modules 240 and indexing engines 220 may be a single module. Search engine 122 may be a portion of a larger program, such as a document management program, may be a separate program or may be implemented according to any suitable programming architecture. In one embodiment, the processes of search engine 122 may be distributed across multiple computer systems. Furthermore, while in FIG. 3, index 124 is illustrated as a single index, index 124 may comprise a set of smaller indexes. For example, a separate index can be used by each indexing engine.

Figures 4, 5:
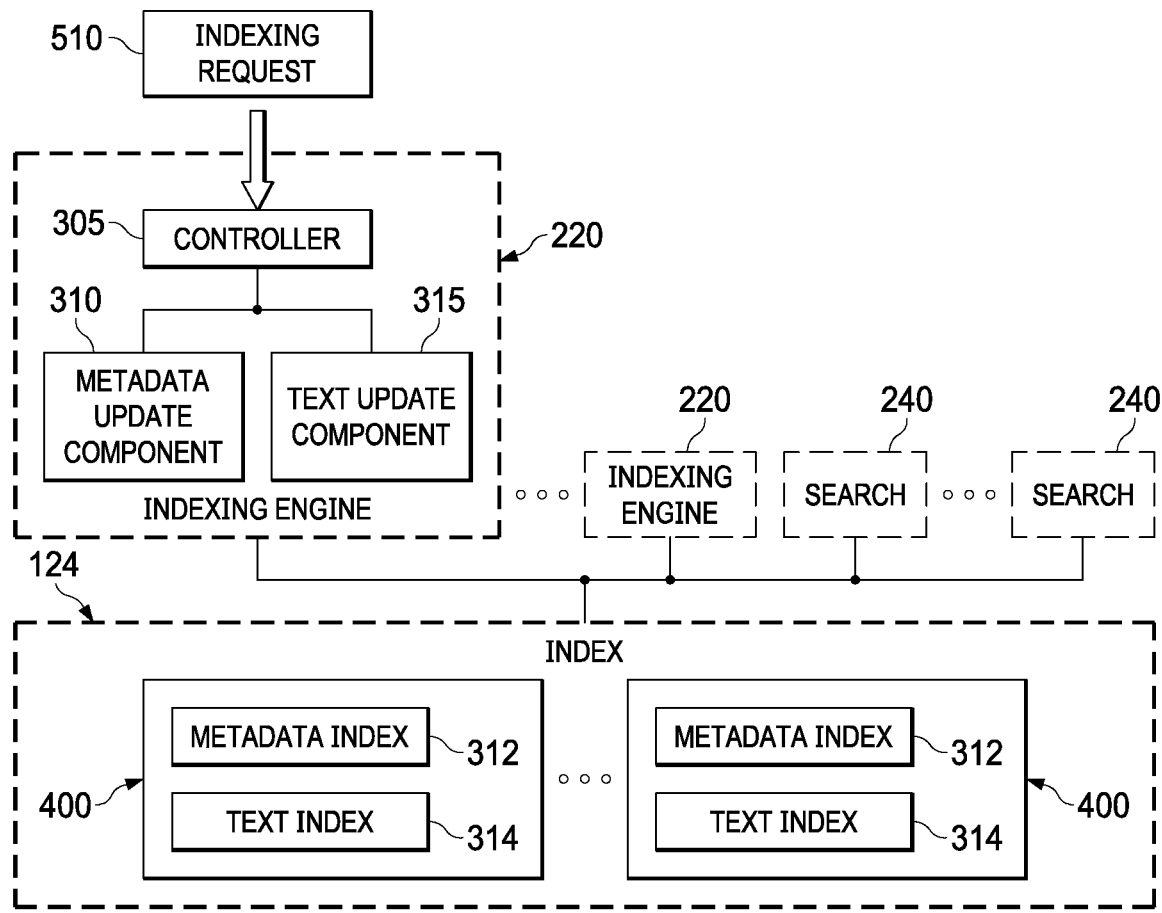
FIG. 4 depicts a diagrammatic representation of one embodiment of regions or fields for a portion of an index.
FIG. 5 depicts a functional block diagram illustrating one embodiment of an indexing engine.

FIG. 4 depicts a diagrammatic representation of one embodiment of regions or fields for a portion of index 124. Index 124 includes a list of some or all objects 107 in repository 105 (FIG. 1), each identified by a unique identifier 301 (also referred to as object ID). Index 124 further includes a set of metadata regions 300 (also referred to as metadata fields). A metadata field 300 may include more than one entry for an object. The metadata fields can each have associated values in value storage locations within storage unit 118. In other embodiments, the values may be discarded. The index may include a list of dictionary terms contained in the metadata values of the object and pointers to where the metadata values corresponding to the field are stored. Index 124 may also include other regions for an object, such as a text region 302. Text region 302 may, for example, include a list of terms in the text of an object. Index 124 may include some or all of the content of an object.

While shown as a single index, index 124 may be partitioned. In index partitioning, in one embodiment, the index of objects in repository 105 may be split into multiple indexes such that some objects are listed in one index partition, while other objects are listed in the other index partitions. As described below with reference to FIGS. 5 and 6, a 'partition' comprises a portion or fragment of index 124 and is associated with indexing engine 220 and search module 240. Note that it is possible to copy a partition and associate a different index engine and search engine with this copied partition. Index partitioning may also reduce resource usage and search time. Furthermore, separate indexes may be maintained for metadata and text and/or different metadata regions or fields. Index 124 can be stored according to any suitable storage scheme. Example storage schemes may include "Memory Storage," "Disk Storage" and "Retrieval Storage":

Memory Storage: in this storage scheme, all the elements of the index are kept in memory. This provides the fastest operation when search results must be retrieved, since the memory storage mode minimizes disk activity. Conversely, memory storage consumes the most memory in partitions. For example, text regions which are frequently searched and retrieved for display may be held in memory.

Disk Storage: in this storage scheme, the dictionary and index are kept in memory, but the value storage is located on disk within a Checkpoint file. Keyword searches are still fast, but search queries which need to examine the original data, such as phrase searches, are generally slower. Retrieving values from disk for display is also slower. For regions which are not commonly searched and displayed, disk storage may be a desirable choice. Disk storage is also suitable as a storage mode for systems utilizing solid state hardware.

Retrieval Storage: in this storage scheme, storage is optimized for text metadata regions which need to be retrieved and displayed, but do not need to be searchable. As an example, text values may be stored on disk within the Checkpoint file, and there is no dictionary or index at all. This storage scheme can be used, for example, for regions such as Hot Phrases and Summaries.

FIG. 5 depicts a diagrammatic representation of one embodiment of an indexing engine 220 to maintain a partition of index 124. In this embodiment, indexing engine 220 can include an indexing controller 305, a metadata update component 310, and a text update component 315. In this embodiment, index 124 is maintained as a separate metadata index 312, which contains metadata for objects in repository 105, and text index 314, which contains content text from objects in repository 105, with a known relationship between the text and metadata components for each object in the index.

Indexing controller 305 receives indexing requests (e.g., from a distributor, another application or other source). An indexing request received at the indexing controller 305 may include an instruction to add an object, delete an object, modify an object or replace an object in index 124. Such an indexing request may also include the information to be added or changed, such as the full text content to be indexed and the associated metadata for the object. An indexing request may also contain derived metadata.

The text (derived text or full text content) of an indexing request may be a text file. It could be data exported from a database or other information system. Commonly, the text is the human-readable information within a document composed on a computer. In this scenario, a file such as a Microsoft Word document would be analyzed by a filtering step to extract the text, which can be stripped of unnecessary information such as fonts, styles, or page layout information.

The metadata portion of an indexing request may specifically be provided by an application providing the indexing request. This might be data such as an identifier for the object, the date or time it was first added to the system, or the identity of the user who manages the object.

A portion of the metadata can be derived metadata. Derived metadata can include metadata inferred from the text content. For example, the filter or code that extracts the text from a PowerPoint presentation might also create metadata about the presentation. In this example, the generated metadata may include the number of slides in the presentation, the title of the file, the name of the presentation author stored in the PowerPoint file, or the size of paper the presentation was designed to print on. More complex examples of derived metadata might include statistical analysis to generate a list of keyword or key concepts in the document, determining the subject person or company of the text, sentiment analysis (the positive or negative tone of the text), or identification of the language in which the text is written. Derived metadata may also include data inferred from processing an object. For example, in processing a PowerPoint presentation, derived metadata may include a timestamp of the time the PowerPoint was processed or the location where the PowerPoint presentation was processed.

An indexing engine can receive an indexing request 510 from an application, distributor or other source. Indexing request 510 specifies an operation to be taken on index 124 for an object and any metadata or text for that action. For context, an application that generates an indexing request may be a corporate document management system, a web site with a search capability such as an online store, or a desktop search program for email.

According to one embodiment, for example, an indexing request can take the form of an indexing object that includes a unique identification for an object, an operation, the metadata or text regions affected and the metadata and/or text for the index. By way of example, but not limitation, indexing operations may include adding, replacing, modifying and deleting information in the index, or combinations thereof. The following provides some exemplary operations that may be included in indexing requests.

AddOrReplace: this operation can be used to create new objects in the index. According to one embodiment, if the object does not exist, it will be created, but if an entry with the same object identification exists, then it will be completely replaced with the new data, equivalent to a delete and add.

AddOrReplace: this function may distinguish between content and metadata. If an object already exists, and metadata only is provided, the existing full text content is retained.

AddOrModify: this operation will update an existing object, or create a new object if it does not already exist. When modifying an existing object, only the provided content and metadata is updated. Any metadata regions that already exist which are not specified in the AddOrModify command will be left intact.

Delete: this operation will remove an object from the index, including both the metadata and the content.

Indexing controller 305, according to one embodiment, is a component which interprets the indexing request 510 to determine how it should be processed. Indexing controller 305 can identify whether a text indexing command exists, and, if so, send the command with the necessary parameters to the text update component 315. Indexing controller 305 can likewise determine if any metadata indexing operations are required, and if so, send the command with necessary parameters to the metadata update component 310.

Text update component 315 is responsible for processing requests to index full text content. This may include tasks such as maintaining a dictionary of search terms, maintaining the internal search data structures, and updating the storage representation of the text portion of the search index in memory or on disk as appropriate. Text update component 315 may support instructions such as Add an Object, Replace an Object, or Delete an Object.

Metadata update component 310 is responsible for processing requests to index metadata 312 associated with an object in index 124. This may include building and maintaining dictionaries of search terms, maintaining internal search data structures, and updating the representation of the metadata portion of the search index in memory or on disk as appropriate. Metadata update component 310 may support instructions such as Add an Object, Replace an Object, or Delete an Object.

The embodiment of FIG. 5 is provided by way of example. Indexing engine 220 may include any number of other modules to update and search an index. Indexing engine 220 may be a portion of a larger program, such as a document management program, may be a separate program or may be implemented according to any suitable programming architecture. In one embodiment, the processes of indexing engine 220 may be distributed across multiple computer systems.

As discussed above, an index may be partitioned. For example, in order to scale to large sizes, the search index may be broken into partitions. When new objects are added to the search index, a method of determining which partition should be the recipient of the new datum may be utilized. For example, one strategy may include allocating partitions based on a modulus of an object ID. As another example, a round-robin technique may be used to add new objects to partitions which have available capacity. One skilled in the art of computing will understand that there may be many possible strategies.

Figure 6:
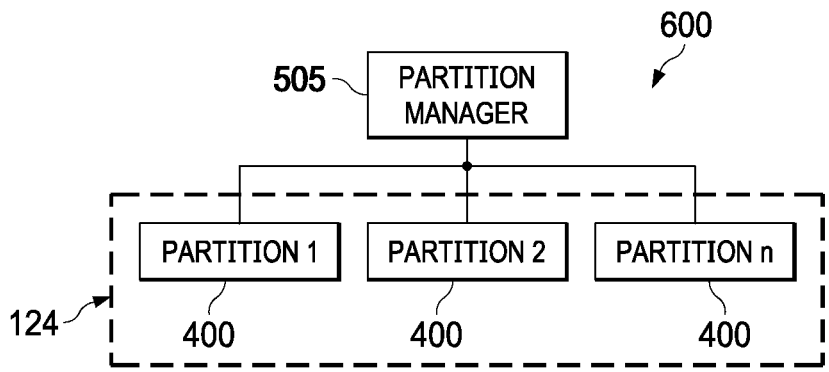
FIG. 6 depicts a diagrammatic representation of one embodiment of an index with multiple partitions connected to and being managed by a partition manager.

FIG. 6 depicts a diagrammatic representation of one embodiment of system 600 for managing partitions. In the embodiment of FIG. 6, index 124 is divided into "n" partitions 400, with each partition including a metadata index and a text index. As illustrated in FIG. 5, in one embodiment, each partition can have its own indexing engine 220 and search module 240.

A partition manager can be configured to manage these partitions. Partition manager 505 is a component of a search system that accepts indexing requests, determines which partition should service an indexing request, and provides the indexing request to the appropriate indexing engine 220. In one embodiment, partition manager 505 can be a logical function of a search engine in the search system which, in turn, can be part of a document management system. In one embodiment, partition manager 505 can be a logical function of distributor 210 shown in FIG. 3. An indexing engine (e.g., indexing engine 220 shown in FIG. 3) for a partition performs the actual indexing operations of adding, deleting or modifying data in the partition. Likewise, partition manager 505 may be able to federate search queries to multiple search engines 240 associated with multiple partitions and combine the results. In one embodiment, this function of partition manager 505 may be incorporated in a federator (e.g., federator 245 shown in FIG. 3).

In some embodiments, a search system can be configured so that each partition can have a set memory limit for processing information for indexing in the partition. For example, one or more of the partitions may be designated to be configured with substantially greater capacity memory (e.g., RAM) than other (non-designated) partitions that may be configured with lesser capacity memories. For example, the one or more of the designated partitions may be configured with at least 4 GB (gigabytes) more RAM than the other non-designated partitions. One skilled in the art of computing will understand that 4 GB is used here merely as an example of what may be currently interpreted as "substantially greater capacity" memory, without limiting the term to only 4 GB. Further, if multiple partitions are designated for indexing large objects, the multiple partitions may each be configured with different amounts of RAM (e.g., in accordance with a user's budget for computing resources). The one or more designated partitions with the greater memory capacity may be designated as reserved for processing indexing requests that may be determined as requiring processing substantially more information than other indexing requests. For example, a predetermined threshold value may be used for determining how much information is "substantially more" information. For example, a predetermined threshold value may be set at a value of 10 MB (megabytes) of text and/or metadata, such that indexing requests that may be determined as requiring processing 10 MB or more of text and/or metadata may be forwarded to a reserved partition for processing. Note that this predetermined threshold value may be a different value for different users, and may be adjusted as needed (e.g., a value of 5 MB may be more desirable for some users). For these indexing requests, the partition manager 505 may determine that the indexing requests are requests for processing a "large object," and may forward the large object indexing requests to a reserved partition for processing, using the substantially greater memory capacity for the processing.

Figure 7:
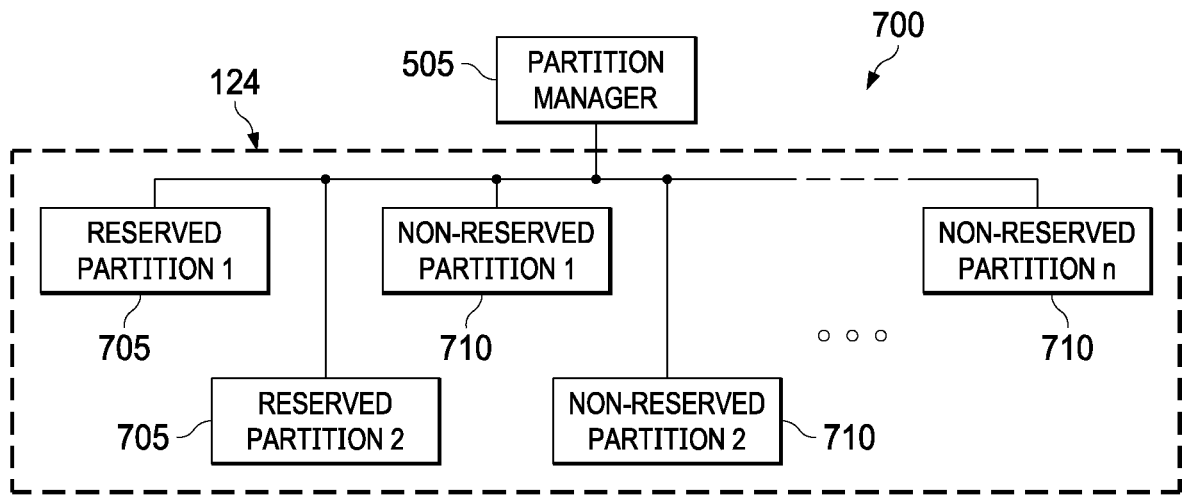
FIG. 7 depicts a diagrammatic representation of one embodiment of an index with reserved partitions and non-reserved partitions connected to and being managed by a partition manager.

As discussed above, an index may be partitioned into reserved and non-reserved partitions. FIG. 7 depicts a diagrammatic representation of one embodiment of system 700 for managing reserved partitions and non-reserved partitions. In the embodiment of FIG. 7, index 124 is divided into one or more reserved partitions 705, and "n" non-reserved partitions 710, with each partition including a metadata index and a text index. As illustrated in FIG. 5, in one embodiment, each partition 705, 710 can have its own indexing engine 220 and search module 240. As discussed above, the reserved partitions 705 may be configured with substantially more memory capacity than the non-reserved partitions 710. As discussed above, the partition manager 505 may determine that an indexing request 510 includes a substantially large amount of information for indexing (e.g., an indexing request that exceeds a predetermined large request threshold value), and may forward the indexing request to one of the reserved partitions 705.

For indexing requests that the partition manager 505 determines may not require processing substantially more information, such indexing requests may be provided to one of the other non-designated partitions (i.e., non-reserved partitions 710) for processing, using a lesser capacity memory for the processing. In this way, indexing requests that are determined as requiring substantially more memory for processing, may be handled by reserved partitions that are better equipped to handle such requests, thus reducing wait times at non-reserved partitions 710 configured with lesser memory capacities.

In some embodiments, the memory sizes of the various index partitions may be represented in one or more configurations files associated with the search system 101. In some embodiments, the threshold value(s) associated with the very large object status may be represented in one or more configurations files associated with the search system 101. In some embodiments, other parameters (stored in one or more configuration files) may be used in a determination to send an indexing request to a reserved partition. For example, the other parameters may be indicators that significant indexing processing may be needed for a particular indexing request.

In some embodiments, the index partitions may be implemented on different physical devices for each separate partition, and thus the additional memory may be configured on the devices implementing the reserved index partitions. In some embodiments, the index partitions may be implemented on different virtual devices for each separate partition, and thus the additional memory may be allocated for the virtual devices implementing the reserved index partitions.

Partition manager 505 can create new partitions as needed. By way of example, but not of limitation, partition manager 505 can create a new partition when all the other partitions are full, or nearly full.

Figure 8:
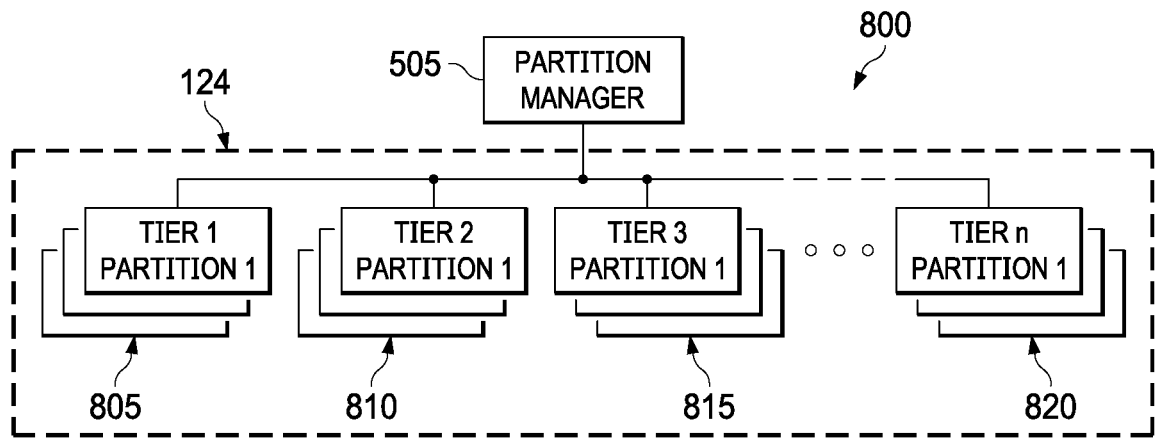
FIG. 8 depicts a diagrammatic representation of one embodiment of an index with a plurality of tiers of partitions connected to and being managed by a partition manager.

As discussed above, a plurality of tiers of index partitions may each be designated as being capable of handling a particular range of required computing resources for handling indexing requests associated with objects having varying attributes. FIG. 8 depicts a diagrammatic representation of one embodiment of system 800 for managing multiple tiers of index partitions. In the embodiment of FIG. 8, index 124 is divided into a plurality of tiers of partitions 805, 810, 815, 820, with each partition including a metadata index and a text index. As illustrated in FIG. 5, in one embodiment, each partition in the tiers 805, 810, 815, 820 can have its own indexing engine 220 and search module 240. As discussed above, the tiered partitions may be configured with varying amounts and/or qualities of computing resources (e.g. memory, processors, disk storage, etc.). As discussed above, the partition manager 505 may determine an attribute (e.g., amount, quality, etc.) of required computing resources for indexing an object associated with an indexing request. Based on the determined attribute, the indexing request may be processed for a partition included in a tier associated with a range of computing resources that matches the determined attribute.

In this way, indexing requests that are determined as requiring differing computing resources may be handled by tiered partitions that are better equipped to handle such requests, thus reducing wait times at other partitions.

In some embodiments, the attributes of the various index partitions may be represented in one or more configurations files associated with the search system 101. In some embodiments, the tier range value(s) associated with the tiered partitions may be represented in one or more configurations files associated with the search system 101. In some embodiments, other parameters (stored in one or more configuration files) may be used in a determination to send an indexing request to a particular tier.

Example techniques discussed herein for allocation of partitions may provide capabilities for very large documents to be handled for partitions with larger disks, or disks with varying size/performance characteristics.

In some environments, different types of computers with different characteristics may be more appropriate for large or small object partitions. For example, "small object (non-reserved)" partitions may be deployed on a virtual machine that may have 4 GB memory restrictions. For example, the "large object (reserved)" partitions may need 10 GB of memory, which may exceed the policies for virtual machines in an environment, and thus can be directed to alternative hardware that has larger memory spaces available (thus, optimizing, at least, cost).

Further, when computing relevance, search engines may use IDF or other techniques to help prioritize relevance. With very large documents, other techniques for relevance may be desirable. Example techniques discussed herein may provide segregation of such documents to better enable application of appropriate relevance.

Further, heuristics for identifying "garbage" objects to discard may need to be different for very large files. Example techniques discussed herein may provide partitioning that may make it very easy/convenient to use alternative algorithms.

For example, if alternative search or indexing techniques are appropriate for large objects, sometimes it may not be possible to mix and match data structures that are optimal for large and small. Having them clearly separated (as with the example techniques discussed herein) makes this more viable.

FIG. 9 depicts a flow chart illustrating an example of a method for managing indexing partitions according to some embodiments. In the example shown in FIG. 9, at 905, a designated reserved indexing partition may be provisioned with substantially more processing memory than non-reserved indexing partitions in a search system. At 910, an indexing request may be obtained.

At 915, a size status of the indexing request may be determined. At 920, a determination is made whether the size status indicates that a size of the object to be indexed exceeds a predetermined threshold value. At 925, the indexing request is forwarded to the designated reserved indexing partition, if the size status indicates that a size of the object to be indexed exceeds a predetermined threshold value. Otherwise, at 930, the indexing request is forwarded to a non-reserved indexing partition for indexing.

FIG. 10 depicts a flow chart illustrating an example of a method for managing indexing partitions according to some embodiments. In the example shown in FIG. 10, at 1005, a plurality (e.g., n) of indexing partitions may be provisioned with varying processing resources. At 1010, an indexing request may be obtained.

At 1015, a resource requirement status of the indexing request may be determined. At 1020, a determination is made whether the resource requirement status indicates that resource requirements for processing the object to be indexed fits within a range of resources for any of the tiers (e.g., by checking threshold values associated with ranges). At 1025, the indexing request is forwarded to the appropriate tier of indexing partitions, if the resource requirement status indicates that a resource requirement of the object to be indexed fits within a range of one of the tiers. Otherwise, at 1030, the indexing request is forwarded for further processing (e.g., discarded, processed further, etc.).

Thus, embodiments of a search system can maintain a search index of metadata and text for objects in a repository, repositories or distributed across a network. The search index can be divided into partitions, with one or more of the partitions designated as reserved partitions for processing indexing of very large objects.

The invention disclosed here describes a system where the partition maintenance is not visible, and is otherwise transparent to the end user. Specifically, a user query issued during any stage of partition maintenance is answered using a consistent and complete view of all objects in the repository regardless of the current partition in which a given object resides. The intelligent partition management described above can therefore occur 'online' or 'live'. In this context, 'online' or 'live' means that there is no interruption in the search service from the end user's perspective. This is an advantage over 'offline' systems where the search service (s) must be temporarily disabled (taken offline) to allow maintenance of the partitions. In such an 'offline' system, a user may not be able to issue queries during maintenance as such queries would produce incomplete search results.

Again, it will be appreciated that that while certain embodiments as described may differentiate partitions based on the size of an object, other criteria or variables may be used to differentiate or separate partitions for indexing. Such other criteria may include, for example, speed of disk I/O, amount of disk space, number or speed of CPUs, presence of co-processors, or other criteria. Likewise, in certain embodiments there may be other decision parameters for determining whether different partitions are needed or desired, such as complexity measurements, type of data (e.g. video), or other parameters.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A system, comprising:
    a processor; and
    a computer readable medium storing instructions translatable by the processor to implement a search engine that includes a distributor, the distributor:
        obtaining indexing requests wherein each indexing request is for indexing an associated object, wherein the obtained indexing requests include text and metadata associated with the associated object to be indexed;
        determining a size status of the indexing for each indexing request based on a size of the associated object and whether the request for indexing the associated object represents a request for indexing the associated object that requires processing an amount of information for the indexing of the associated object that exceeds a predetermined threshold amount associated with indexing resources, wherein the amount of information is determined based on the obtained indexing request including text and metadata associated with the associated object to be indexed; and using the determined size status for the indexing requests:
- forwarding a first set of the indexing requests to a reserved indexing partition that is reserved for processing indexing of very large objects, when the determined size status for the first set of the indexing requests indicates the predetermined threshold amount was exceeded for that first set of indexing requests for indexing the associated objects; and
- forwarding a second set of the indexing requests to a non-reserved indexing partition that is not reserved for processing indexing of very large objects, when the determined size status for the second set of the indexing requests indicates the predetermined threshold amount was not exceeded for that second set of indexing requests.

2. The system of claim 1, wherein the reserved indexing partition is configured with substantially more memory for processing indexing requests than the non-reserved indexing partition.

3. The system of claim 1, wherein the search engine includes a plurality of indexing engines that are each associated with a respective one of a plurality of indexing partitions.

4. The system of claim 3, wherein each of the respective indexing engines includes a metadata update component and a text update component.

5. The system of claim 1, wherein the plurality of index partitions include the reserved index partition and the non-reserved index partition.

6. The system of claim 1, wherein the non-transitory computer readable medium stores instructions translatable by the processor to implement an object analyzer module, the object analyzer module performing:
- obtaining the objects for indexing;
- processing the obtained objects to determine text and metadata associated with the obtained objects; and
- providing the determined text and metadata associated with the obtained objects to the search engine.

7. A method comprising:
- provisioning at least one designated reserved indexing partition with substantially more indexing resources than a plurality of non-reserved indexing partitions associated with a search system;
- obtaining indexing requests wherein each indexing request is for indexing an associated object, wherein the obtained indexing requests include text and metadata associated with the associated object to be indexed;
- determining a size status of the indexing for each indexing request based on a size of the associated object and whether the request for indexing the associated object represents a request for indexing the associated object that requires processing an amount of information for the indexing of the associated object that exceeds a predetermined threshold amount associated with indexing resources, wherein the amount of information is determined based on the obtained indexing request including text and metadata associated with the associated object to be indexed; and
- using the determined size status for the indexing requests:
  - forwarding a first set of the indexing requests to a reserved indexing partition that is reserved for processing indexing of very large objects, when the determined size status for the first set of the indexing requests indicates the predetermined threshold amount was exceeded for that first set of indexing requests for indexing the associated objects; and
  - forwarding a second set of the indexing requests to a non-reserved indexing partition that is not reserved for processing indexing of very large objects, when the determined size status for the second set of the indexing requests indicates the predetermined threshold amount was not exceeded for that second set of indexing requests.

8. The method of claim 7, wherein the reserved indexing partition is configured with substantially more memory for processing indexing requests than the non-reserved indexing partition.

9. The method of claim 7, wherein the search engine includes a plurality of indexing engines that are each associated with a respective one of a plurality of indexing partitions.

10. The method of claim 9, wherein each of the respective indexing engines includes a metadata update component and a text update component.

11. The method of claim 7, wherein the plurality of index partitions include the reserved index partition and the non-reserved index partition.

12. The method of claim 7, wherein the non-transitory computer readable medium stores instructions translatable by the processor to implement an object analyzer module, the object analyzer module performing:
- obtaining the objects for indexing;
- processing the obtained objects to determine text and metadata associated with the obtained objects; and
- providing the determined text and metadata associated with the obtained objects to the search engine.

13. A non-transitory computer readable medium, comprising instructions for indexing objects by:
- obtaining indexing requests wherein each indexing request is for indexing an associated object, wherein the obtained indexing requests include text and metadata associated with the associated object to be indexed;
- determining a size status of the indexing for each indexing request based on a size of the associated object and whether the request for indexing the associated object represents a request for indexing the associated object that requires processing an amount of information for the indexing of the associated object that exceeds a predetermined threshold amount associated with indexing resources, wherein the amount of information is determined based on the obtained indexing request including text and metadata associated with the associated object to be indexed; and
- using the determined size status for the indexing requests:
  - forwarding a first set of the indexing requests to a reserved indexing partition that is reserved for processing indexing of very large objects, when the determined size status for the first set of the indexing requests indicates the predetermined threshold amount was exceeded for that first set of indexing requests for indexing the associated objects; and
  - forwarding a second set of the indexing requests to a non-reserved indexing partition that is not reserved for processing indexing of very large objects, when the determined size status for the second set of the indexing requests indicates the predetermined threshold amount was not exceeded for that second set of indexing requests.

14. The non-transitory computer readable medium of claim 13, wherein the reserved indexing partition is configured with substantially more memory for processing indexing requests than the non-reserved indexing partition.

15. The non-transitory computer readable medium of claim 13, wherein the search engine includes a plurality of indexing engines that are each associated with a respective one of a plurality of indexing partitions.

16. The non-transitory computer readable medium of claim 15, wherein each of the respective indexing engines includes a metadata update component and a text update component.

17. The non-transitory computer readable medium of claim 13, wherein the plurality of index partitions include the reserved index partition and the non-reserved index partition.

18. The non-transitory computer readable medium of claim 13, wherein the non-transitory computer readable medium stores instructions translatable by the processor to implement an object analyzer module, the object analyzer module performing:
   obtaining the objects for indexing;
   processing the obtained objects to determine text and metadata associated with the obtained objects; and
   providing the determined text and metadata associated with the obtained objects to the search engine.

* * * * *